March 6, 1962     C. P. PORTERFIELD     3,024,406
DIRECT CURRENT CHARGING CIRCUIT
Filed April 7, 1958
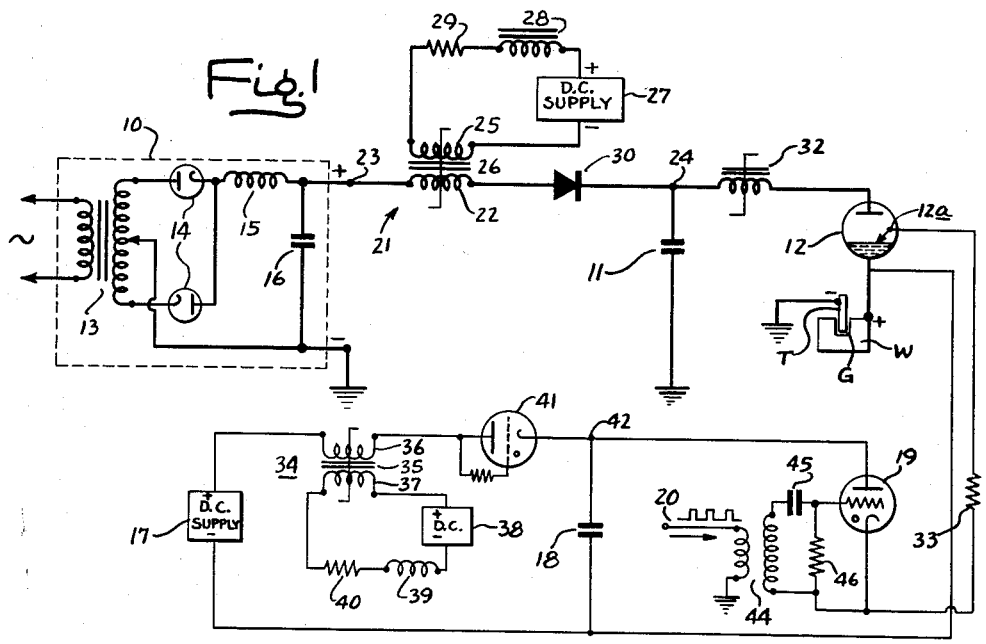
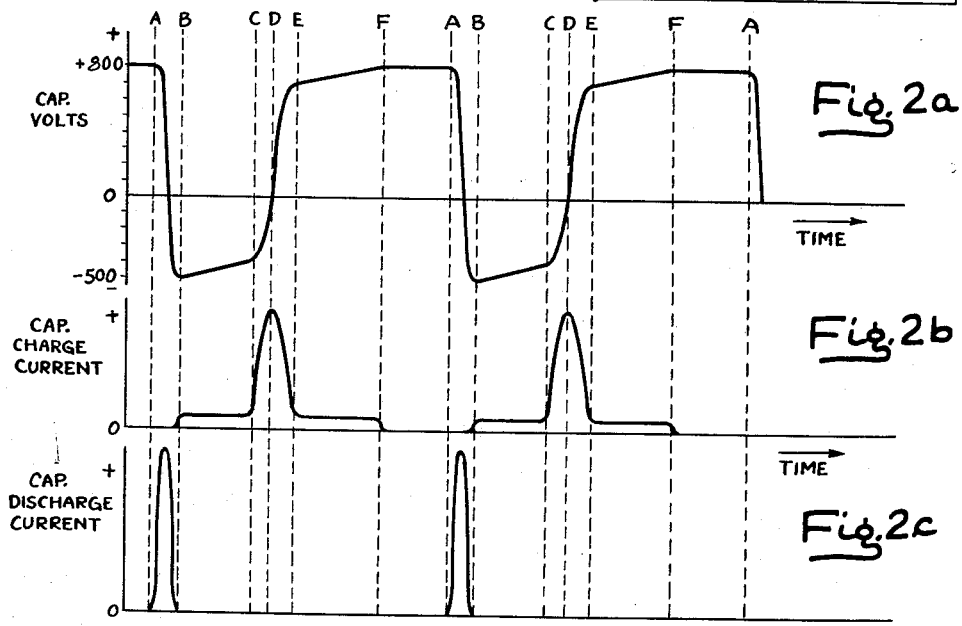
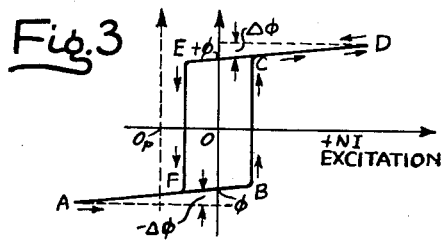
INVENTOR.
CECIL P. PORTERFIELD
BY
Carlsen, Pitzner, Hubbard & Wolfe
ATTYS.

United States Patent Office 3,024,406
Patented Mar. 6, 1962

3,024,406
DIRECT CURRENT CHARGING CIRCUIT
Cecil P. Porterfield, Pittsburgh, Pa., assignor, by mesne assignments, to Elox Corporation of Michigan, Troy, Mich., a corporation of Michigan
Filed Apr. 7, 1958, Ser. No. 726,983
5 Claims. (Cl. 320—1)

This invention relates to spark powering circuits for spark machining or electrode erosion apparatus of the type in which a series of short time-spaced over-voltage initiated discharges are employed to dislodge particles from a conductive workpiece. In its more general aspects it relates to capacitor charging and discharging circuits.

When using a capacitor to store energy from a direct current power source prior to a required short and sudden discharge of the stored energy through a low-impedance load, a common problem is the isolation of the load from the charging source voltage during the discharge or immediately thereafter before the conduction paths are deionized. In spark machining circuits having storage capacitors the problem is a pressing one, since the voltage of the source, if maintained across the spark gap load, will prolong the over-voltage initiated spark discharge between the conductive workpiece and a tool electrode as an arc with likely thermal damage to the workpiece being electrically machined. One solution to the problem has been set forth in Patent 2,756,316, issued July 24, 1956, on the application of E. E. Teubner, in which an inductor in the charging circuit between the capacitor and a D.C. voltage source helps to hold off the source voltage from the capacitor and spark gap for an interval while the gap is still ionized.

The present invention is concerned particularly with further improvements in spark machining charging and switching circuits directed to the attainment of higher repetition rates and greater amounts of energy per pulse from direct current charging supplies. While high power circuits have often included discharge switches such as ignitrons to isolate the gap from the higher capacitor voltages employed, the problem of opening such a switch is difficult wherever inductively stored energy is involved. The repetition rate at high powers has been severely limited. The high energy impulses which so effectively erode the workpiece must not likewise damage the switch electrodes. This poses a difficult equipment problem.

It is a principal object of my invention to provide a simple and automatic means for holding off the capacitor direct current charging voltage in a capacitor charging and discharging circuit until the discharge circuit has been completely opened. Put in other words, it is an object of my invention to provide a simple and improved means for effectively isolating a direct current capacitor charging source from the capacitor discharging circuit without resort to switching contacts in the charging circuit.

More particularly, where a capacitor discharge switch is employed, it is an object of my invention to provide an automatic voltage hold-off means in the direct current capacitor charging circuit to protect the discharge device in the discharge circuit from failure in its opening duty. It is likewise an object to render unnecessary the use of switch contacts in the charging circuit for performing the same function. It is a further object to recapture the inductive or oscillatory energy of the circuit in charging the capacitor.

Briefly, in accordance with one aspect of my invention, a non-linear magnetic switch has its primary or main winding connected in circuit between a direct current charging source and a storage capacitor. A secondary or control winding automatically resets the switch core after the capacitor has charged. The secondary or control winding is connected to a direct current bias source to provide a magnetomotive force opposing that induced by the charging current through the primary winding. A unidirectional conducting device may be additionally connected in series with the main winding and polarized to prevent current flow from the capacitor back into the source when the charging circuit is less than critically damped and thus causes a multiplied voltage to appear across the capacitor. As described herein, the resetting is automatically initiated by the charging of the storage capacitor despite the fact that the charging source and bias source are each an uninterrupted or unmodulated direct current voltage.

Other features, objects and advantages of the invention will become apparent as the description proceeds taken in conjunction with the following drawings in which:

FIGURE 1 illustrates a spark machining apparatus incorporating the invention both in the spark powering circuit and the triggering circuit.

FIGS. 2a, 2b, and 2c respectively plot capacitor voltage, charging current and discharge current against time to illustrate the operation of the invention as embodied in the spark powering circuit of FIG. 1.

FIG. 3 is a generalized plot of flux versus excitation for saturable core materials having a substantially rectangular hysteresis loop as employed in apparatus incorporating the invention.

While the invention is susceptible of various modifications and alternative arrangements and constructions, there are shown in the drawings and will be described in detail certain preferred embodiments. It is to be understood that it is not hereby intended to limit the invention to the claims disclosed, but it is instead intended to cover all modifications, equivalents, and alternatives falling within the spirit and scope of the invention as expressed in the appended claims.

Referring now to FIG. 1 a spark machining apparatus is represented by a circuit diagram illustrating two embodiments of the invention. Referring briefly to some of the elements of the circuit so that the nature of the apparatus may be more readily appreciated as the description proceeds, a main direct current power supply 10, is employed to charge a main or spark-powering capacitor 11 which is in turn connected through a switch 12 to the workpiece W and electrode tool T constituting the electrodes of a gap G. The power supply 10 is illustrated as a stiff or well-regulated voltage source. As shown, a transformer 13 steps up a shop supply voltage, diodes 14 provide full wave rectification, and choke 15 and capacitor 16 smooth the rectified voltage. The capacitor 16 has a capacitance several times higher than that of capacitor 11 so that the output voltage of the supply 10 remains near its rated voltage as the capacitor 11 is charged.

As is known in the spark machining art, the capacitor 11 desirably discharges at a very high power level to provide a short, time-spaced over-voltage initiated discharge across the spark gap G. With the workpiece maintained positive with respect to the electrode tool, and the spark gap flooded with a self-restoring ionizable dielectric fluid such as kerosene, for example, particles are dislodged from the workpiece by successive sparks. To minimize short circuits or open-circuit conditions during the desired discharge periods, an electrode feed means (which need not be shown here) is employed to maintain the gap spacing as the machining proceeds. The machining rate and the many types of machining configurations available make the process particularly economical and otherwise attractive for workpieces of hard metal such as tungsten carbide.

The capacitor charge and discharge circuit thus far referred to are those in the spark-powering circuit; a somewhat similar but lower order of power capacitor charging and discharging circuit is also shown in FIG. 1 as the spark triggering or control circuit. This latter has a direct current power supply 17. A trigger storage capacitor 18 has a discharge circuit including a switching device 19 and the triggering or control path of the power switch 12. The switching device 19 in turn periodically is fired by a source of timed impulses 20 which may be of quite low power level and for which the no voltage hold-off means need be separately employed.

Referring again to the main or spark-powering circuit, the discharge circuit is essentially an ionizable switch load across the capacitor. The spark gap G itself is in the nature of a switch which must be given time to deionize before reapplication of the discharge voltage. Only 20 to 30 volts is sufficient to maintain ionization but after deionization the breakdown voltage at which the sparkover will immediately reoccur has a higher value, depending upon the spacing. This is usually in the order of 100 volts or less at the maximum operating gap spacings desired for machining accuracy. For high powers the energy stored in the capacitor is increased. To this end the charging voltage level of the capacitor 11 is desirably high (the energy stored is proportional to the product of the storage capacitance times the square of the capacitor voltage) and the discharge switch 12 is needed to isolate the spark gap from the capacitor voltage during charging. Particular pains must be taken to permit switch 12 to deionize after each discharge.

The switch may suitably be a mercury pool ignitron or a thyratron having a starting electrode 12a which is used as the control electrode. Like the spark gap itself, such a tube may carry very high peak currents but has a very low voltage drop due to its large ionization current during conduction. The voltage across the electrodes must fall below its ionization potential after the capacitor is discharged for a period long enough to permit the tube to be deionized so that a new charging cycle may begin. Such a switch has a very high short duty rating, being useful for passing peak currents of thousands of amperes and, in the practice of the invention, for repetition rates of thousands of cycles per second.

In accordance with my invention a non-linear magnetic switch 21 is provided having a main winding 22 connected in series between the positive terminal 23 of the direct current supply 10 and the nominally positive terminal 24 of the storage capacitor 11. A secondary or bias winding 25 on the switch core 26 is connected to its own source of direct current 27 through a limiting impedance suitably consisting of an inductance 28 and resistance 29 selected to provide the desired essentially constant current bias excitation. This excitation opposes that provided by the charging current as further explained in a later paragraph.

The material of the saturable core 26 which is linked by the currents of both windings has a generally rectangular hysteresis loop. Characteristic of such materials is the shape of the saturation or excitation curve illustrated generally in FIG. 3 where the core flux is plotted against the magnetizing force. Such materials feature a practically vertical rise of the flux from a loop saturation level in one direction $(-\phi)$ to a loop saturation level in the other direction $(+\phi)$ i.e., abrupt changes in permeability from low to high to low. They also preferably have a high degree of retentivity to remain at or near the saturation level after the excitation current ceases. Magnetizing current in the opposite direction is required to reverse or reset the direction of saturation of the core. The hysteresis loop may be substantial between the general loop saturation levels as shown in the figure. Further excitation causes a slight increase in the core flux at a slight rate of rise, and as the increase in the accompanying hysteresis is generally small, no hysteresis area is enclosed in the traverse of the flux through the increment $\Delta \phi$ beyond the average loop saturation level $+\phi$ or $-\phi$. Within the substantially rectangular hysteresis loop however, the rate of magnetizing current change has little effect and the volt-seconds product time delays can be readily determined. Thus for a given voltage applied across the primary winding 22 a given time elapses until the core 26 is saturated. At this point the winding ceases to present a high impedance to charging current flow into the capacitor, and the impedance drops to a low or practically short-circuit value permitting very rapid charging of the capacitor. During this initial delay the magnetizing current is so small as to place no substantial charge of the capacitor, and the capacitor voltage remains too low to maintain ionization of the discharge circuit. Subsequently the impedance is lowered to provide rapid charging.

Also connected in series with the winding 22 and capacitor 11 is a unidirectional conducting device 30 selected to present little resistance to current flow in the charging direction while presenting a large resistance or open circuit in the opposite direction. Diode gaseous rectifiers ("soft" tubes) are well suited for this purpose, and selenium germanium or silicon diodes may also be used. The forward resistance value of the device 30 while not critical is desirably low to insure less than critical damping of the charging circuit. That is, the total resistance of the charging circuit is low enough with respect to its inductance and capacitance so that it tends to oscillate. The high back resistance of the diode blocks oscillatory current flow from the capacitor back to the supply.

As further shown a saturable reactor 32 is inserted in series with the ignitron 12 in the discharge circuit. Its core has also preferably a rectangular hysteresis loop so that some delay time is involved in resetting the core to help the ignitron to deionize without arc-backs as further explained. The use of the device 32 is optional; it is advantageous to help counteract the longer deionization time of higher current-rated switch devices. There are limitations on the permissible discharge inductance since added discharge inductance increases the capacitor discharge time, but they need not prevent the low-inductance device 32 from being used, within limits, in cooperation with the charging circuit inductor 21.

The operation of the circuit as thus far described may be more fully appreciated by a reference to the voltage-time diagram of FIG. 2 which corresponds to oscilloscope patterns. The time axis of this diagram is lettered at successive significant intervals A to F to represent a charging and discharge cycle. The theory appearing to offer the best explanation of these facts is the basis of the corresponding lettering of the flux plot of FIG. 3.

Assuming that the capacitor 11 has been fully charged at point A of FIG. 2 when the switching device 12 is rendered conductive, the gap G sparks over, and the capacitor is discharged. The voltage falls rapidly through zero voltage to a negative voltage (i.e., where the indicated positive terminal of the capacitor becomes negative with respect to ground) at point B. The voltage slope is very steep, but sinusoidal, corresponding to the wave form at a frequency proportional to $$V \frac{1}{L_d C}$$

where $L_d$ is the inductance of the discharge circuit (primarily that of the leads and the capacitor itself) and C is the storage capacitance. During the time A–B the sparkover discharge occurs at the gap G, and is shown as a discharge current spike or pulse in FIG. 2c.

Looking again at FIG. 2a the capacitor voltage does not immediately rise again however, but increases very slowly over the substantial time interval B–C which is in fact the delay time interval desired and provided by the action of the reactor device 21. Then in the interval C-D-E the voltage again rises very steeply corresponding to the wave form at a frequency proportional to $$V \frac{1}{L_c C}$$

where $L_c$ is the saturated charging inductance of the non-linear switch (plus any other inductance distributed in the charging circuit) and C is the storage capacitance. Then in the interval E-F the voltage increases at a very slow rate. This part of the voltage curve is attributed to the resetting action as further explained. After the voltage reaches point F the switch core is completely reset and may be fired at any time thereafter. The maximum voltage corresponding to F is greater than the voltage of the source 10 due to the oscillatory voltage excursions accompanying the less than critical damping. This condition occurs when the square of the total charging circuit resistance is less than $$\frac{4L_c}{C}$$

The 800 volt maximum value of the curve of FIG 2a is thus obtained with a direct current source voltage 10 of only 250 volts.

If there is any back leakage across the rectifier 30 the voltage on the capacitor 11 tends to decrease slightly from the value at F until it is fired again at point A. It may be seen that despite the pulse steepness corresponding to very high resonant frequencies desirably involved in the discharge circuit and permissibly involved in the charging circuit there is no critical firing time so long as the triggering signal is not applied to the ignitron 12 until the voltage curve of FIG. 2a has reached point F or its vicinity corresponding to the negative saturation or reset condition of the switch core in FIG. 3. The amount of flux traverse ($-\Delta\phi$) beyond the level ($-\phi$) depends upon the leakage current from the capacitor 11 back to the power supply 10 and the value of the bias and is not critical.

While the capacitor discharge quickly brings the flux to point B, it is the change of the core flux from point B which requires the volt-second product for which the core is designed. During this period B-C a voltage equal to the algebraic difference between the supply voltage (in this instance, 250 volts) and the instantaneous capacitor voltage (in the vicinity of $-400$ volts) appears across the winding 22, but only a very small magnetizing current flows. While point 24 is maintained negative, the ignitron 12 and the gap G are afforded ample time to become completely deionized in readiness for the next positive sparkover discharge.

The very abruptness of the voltage reversal in the discharge circuit may not only quench the ionized discharge, but the negative voltage shown at point B in FIG. 2a may appear at the anode of the ignitron 12 before it has had an opportunity to deionize. Under such a condition, and such conditions have been encountered where spark repetition rates in the order of 2 or more kilocycles per second are involved, a destructive arc-back may occur in the ignitron save for the presence of the discharge circuit hold-off saturable core reactor 32. The core of the discharge reactor 32, saturated in one direction by the flow of discharge current, is reset by the reverse voltage. This magnetizing current as leakage current through the ignitron is too low to maintain the ignitron in an ionized condition. The resulting delay of application of the full inverse or reverse voltage across the ignitron insures its deionization. It will be appreciated that the hold-off action of the charging circuit saturable reactor 21 helps maintain the high negative voltage during the interval B-C, thus making available a high volt-seconds product for resetting the core of the discharge reactor 32. Critical design requirements of the reactor 32 are thus avoided and relatively low inductance windings may be employed so that the net effect of the use of the inductance 32 is to increase rather than decrease the repetition rate at which a given ignitron may be employed.

During the interval C-D-E after the core 26 of the device 21 has become saturated in the positive direction, very little impedance is offered to the flow of charging current and the capacitor voltage rapidly rises, as shown in FIG. 2a. As the capacitor 11 nears its maximum charge, the charging current decreases. FIG. 2b illustrates the current impulse rising from the low magnetizing current level at C to a maximum value D and down again to a low value at time E. FIG. 2b is not to scale since the current level at D may be several times that at C.

During this time the negative or opposing excitation provided by the voltage source 27 in the bias winding 25 is exceeded by the excitation produced by the charging current. However, as the charging current decreases the effect of the bias winding excitation becomes dominant. It is believed, from observations of the effect of changing of the bias value and the rectifier back resistance 30a, that the bias flux exceeds the charging flux in the vicinity of point E of FIG. 3, and that after a volt-second delay interval E-F the core flux again rapidly changes from a positive to a negative saturation level.

Going further into the theory of operation the relation of the charging current and bias current excitation components for the core 26 are graphically illustrated in FIG. 3. A dotted vertical axis provides a reference for the apparent primary excitation needed to produce the observed effects. From this primary point of view, the primary zero excitation ($0_p$) is to the left of the hysteresis loop. At point E, with reference to the dotted primary-view axis, the primary ampere-turns excitation is insufficient to prevent the core from returning to the opposite saturation. This is due, of course, to the steadily maintained core bias. Thus capacitor voltage continues to increase at a slow rate from points E to F on FIG. 2a at the time the net bias excitation is resetting the core.

The inductance component of the reactor 21 shown in FIG. 3 causes the slight increase in flux as the excitation is increased beyond the loop saturation level. It thus contributes to the less than critical damping to play a role in the ultimate charging of the capacitor 11 to a voltage much higher than that of the direct current source 10.

It will be appreciated that the rectifier device 30 relieves what otherwise might be critical timing requirements for the signal applied to the control electrode 17 of the ignitron 12. An oscillatory reverse swing of the voltage stored on the capacitor 11 is prevented. The inductance associated with the capacitor charge and discharge circuits which causes the oscillatory tendencies of the charging voltage is thus used to advantage. In effect, oscillatory energy of the charging circuit is captured and that of the discharge circuit recaptured, and discharge of the high capacitor voltage back into the source 10 is prevented.

It is important that temporary malfunctioning of the discharge circuit should not prevent the charging circuit from remaining in constant readiness while the fault is cleared. In view of the possibility that the spark gap G may become short-circuited and remain so during the normal discharge period, there are conditions when the discharge switch 12 effectively is the sole load across the capacitor (with the exception of the distributed circuit inductance). This does not prevent its deionization and reopening of the discharge circuit so that the capacitor 11 can recharge and the core 26 can reset following each operation of the switch 12. When for some reason the control electrode 17 of the ignitron 12 does not successfully initiate conduction, as when the spark gap spacing is too great to permit firing at the capacitor voltage, the capacitor 11 remains charged. Under these conditions, since the source 10 is a direct current source, the core 26 remains in its reset state. Whenever the faulty gap condition is remedied, the discharging and recharging cycles resume without need for intervention.

Reference thus far has been made to the incorporation of the invention in the spark powering circuit where the high powers involved offer particularly difficult switching problems. Even the trigger or control circuit for the ignitron 12 also advantageously incorporates the invention as further shown in FIG. 1. Thus the ignitron or starting electrode 12a of the ignitron 12 is provided with a positive pulse voltage with respect to the mercury pool or cathode of the ignitron to initiate conduction. This positive pulse of energy is advantageously provided by the sudden discharge of the trigger capacitor 18, a switching device such as a thyratron 19, plus the starter-to-mercury-pool portion of the ignitron 12, being connected in series across the capacitor 18 as its discharge circuit. This discharge circuit may optionally include a resistor 33 shown in series with the ignitron starter electrode, to limit the ignitor current to a safe value in accordance with the ignitor rating.

Again, in accordance with the invention, a hold-off switch is employed in the capacitor charging circuit. The switch 34 in this instance also has a saturable core 35 of the type having a substantially rectangular hysteresis loop. Its main or primary winding 36 is connected between the direct current supply 17 and the capacitor 18. A secondary winding 37 on the core of the device 34 provides a constant bias, being connected to its own direct current source 38 through a limiting impedance suitably comprising an inductor 39 and a resistor 40 in the manner shown for the secondary circuit of the inductor 21. Shown in series with the primary winding 36 of the device 34 is a diode 41 which in this instance is shown as a thyratron having its control electrode connected to its anode to pass current in the easy-flow direction from the positive terminal of the direct current supply 17 to the ungrounded terminal 42 of the capacitor 18.

The source of trigger pulses indicated at 20 may suitably be any conventional low power impulse generator. As shown here the source is inductively coupled by means of a transformer 44 to appear between the grid and cathode of the thyratron 19. A capacitor 45 in the grid lead and a resistor 46 between the grid and cathode help provide a stable and reliable circuit for making the grid temporarily positive with respect to the cathode, or at least sufficiently less negative, to cause the tube to fire upon initiation of an impulse.

The trigger hold-off circuit operates in the same manner as described in connection with the spark powering circuit. Usually the triggering circuit has fewer problems associated with it than has the spark circuit in view of the more constant or predictable nature of the load and the smaller currents involved, although in some instances, the mercury of the ignitron 12 may blow away from the tip of the starting electrode causing open circuit operation of the trigger circuit.

When the timing of the discharge switching is accurately and reliably maintained to occur at or near point F, the diode 41 may be omitted from the circuit. Some assistance in resetting the reactor core is realized by the flow of current from the capacitor back to the source (if the charging circuit is less than critically damped). However, the device 21 is switched to conduct this reverse current rapidly and discharge the capacitor back into the source unless the discharge switch closes at the instant the core is reset.

It will be appreciated that the usual skill of the art in designing the core dimensions and turns of the saturable core devices 21 and 34 may be drawn upon to meet the time available for charging and discharging the capacitors 11 and 18. Should no time be allowed for resetting then, of course, the switch 21 or 34 acts merely as a simple linear or near-linear small inductance and does not take advantage of the nearly vertical portion of the magnetization curve between the negative and positive saturation levels. However, since synchronization of the switch to operate exactly at point F is quite unnecessary, in view of the rectifiers 30 and 41, the circuit remains practical for a wide range of operating conditions within the limits of readily available circuit components.

I claim as my invention:

1. A capacitor charging and discharging circuit having a storage capacitor, a first winding connected in series to a source of direct current voltage for charging the capacitor, a load circuit including a switch connected across the capacitor for discharging the capacitor when the switch is closed, timed means for periodically closing said switch after the capacitor has been charged, and means for automatically holding off the application of the source voltage to the capacitor during a delay interval following initiation of discharge of the capacitor, said means comprising a saturable magnetic switching core inductively linked by said first winding for limiting the flow of charging current to a small core magnetizing level after the capacitor has been discharged and for a delay interval until the core has been saturated, a bias winding on the core, and means for supplying an essentially constant direct bias current for overcoming the magnetizing effect of the winding and resetting the core to saturation in the opposite direction after the charging current has decreased to a low value.

2. In a capacitor charging and discharging circuit of the type in which the charging circuit connected across the capacitor includes a source of direct current and the discharge circuit connected across the capacitor includes a discharge device switch having means for closing and opening the switch after the capacitor has been charged, means for automatically holding off the application of the direct current source voltage to the capacitor for a delay interval following the closing of the switch and until the switch is opened, which means comprises a magnetic switch core having a substantially rectangular hysteresis loop, means for providing a constant current excitation capable of saturating the core in one direction in the absence of a counter excitation, and a winding on said core connected in series in said charging circuit to provide an overriding counter excitation of the core for saturating the core in the opposite direction after said delay interval whereby current flows until the capacitor is charged.

3. A capacitor charging and discharging circuit comprising a storage capacitor, a source of direct current voltage, an inductive winding and a unidirectionally conducting device connected in series with said capacitor across said voltage source as a less than critically damped charging circuit for charging the capacitor, an ionizable load including a switch connected across the capacitor, timed means for periodically closing and opening said switch after the capacitor has been charged to discharge the capacitor in a single current impulse, and delay means for automatically holding off the application of the source voltage to the capacitor during a delay interval following initiation of discharge of the capacitor, said delay means comprising a saturable switching core having a substantially rectangular hysteresis loop and linked by said inductive winding, a bias winding on the core, and means for connecting said bias winding to a substantially constant magnetizing voltage for saturating the core in a given direction in the absence of core excitation by said inductive winding, said inductive winding being connected to saturate the core in the other direction by application of charging circuit voltage for said delay interval.

4. A capacitor charging and discharging circuit comprising a storage capacitor, means comprising an ionizable load for discharging the capacitor after it has been charged, a magnetic switching device with first and second windings linking a core having a substantially rectangular hysteresis loop, a rectifier, means connecting said first winding and said capacitor across a charging voltage source through said rectifier to recharge the capacitor after the reactance of the first winding is switched off by saturation of the core, and means connecting said second winding to a unidirectional current source to saturate the core in the opposite direction after the flow of charging current has decreased.

5. A capacitor charging and discharging circuit having a storage capacitor, a first winding and a unidirectional conducting device connected in series to a source of direct current voltage for charging the capacitor, a load circuit including a switch connected across the capacitor for discharging the capacitor when the switch is closed, timed means for periodically closing said switch after the capacitor has been charged, and means for automatically holding off the application of the source voltage to the capacitor during a delay interval following initiation of discharge of the capacitor, said means comprising a saturable magnetic switching core inductively linked by said first winding for limiting the flow of charging current to a small core magnetizing level after the capacitor has been discharged and for a delay interval until the core has been saturated, a bias winding on the core, and means for supplying an essentially constant direct bias current for overcoming the magnetizing effect of the winding and resetting the core to saturation in the opposite direction after the charging current has decreased to a low value.

References Cited in the file of this patent

UNITED STATES PATENTS

| | | |
|---|---|---|
| 2,404,971 | Mahoney | July 30, 1946 |
| 2,459,154 | England | Jan. 18, 1949 |
| 2,756,316 | Teubner | July 24, 1956 |
| 2,773,168 | Williams | Dec. 4, 1956 |
| 2,798,934 | Bruma | July 9, 1957 |